(12) United States Patent
Connell et al.

(10) Patent No.: US 8,544,557 B2
(45) Date of Patent: Oct. 1, 2013

(54) FRAME SECTION PIVOT LIMITING DEVICE

(75) Inventors: Richard J. Connell, Slater, IA (US);
Narayanan E. Esakkimuthu,
Coimbatore (IN)

(73) Assignee: Deere & Company, Moline, IL (US)

( * ) Notice: Subject to any disclaimer, the term of this patent is extended or adjusted under 35 U.S.C. 154(b) by 0 days.

(21) Appl. No.: 13/361,110

(22) Filed: Jan. 30, 2012

(65) Prior Publication Data
US 2013/0180741 A1 Jul. 18, 2013

(30) Foreign Application Priority Data

Jan. 17, 2012 (IN) .......................... 159/MUM/2012

(51) Int. Cl.
*A01B 49/00* (2006.01)
(52) U.S. Cl.
USPC .......................................................... 172/311
(58) Field of Classification Search
USPC .......................... 172/311, 776, 456, 466, 452
See application file for complete search history.

(56) References Cited

U.S. PATENT DOCUMENTS

| | | | | |
|---|---|---|---|---|
| 3,702,639 A | | 11/1972 | Womble et al. | |
| 3,774,693 A | * | 11/1973 | Orthman | 172/311 |
| 3,941,194 A | * | 3/1976 | Orthman | 172/311 |
| 4,030,551 A | * | 6/1977 | Boetto et al. | 172/126 |
| 4,046,203 A | * | 9/1977 | Ward | 172/456 |
| 4,058,170 A | | 11/1977 | Ankenman et al. | |
| 4,074,766 A | * | 2/1978 | Orthman | 172/311 |
| 4,150,725 A | | 4/1979 | Crumrine | |
| 4,151,886 A | * | 5/1979 | Boetto et al. | 172/311 |
| 4,281,720 A | * | 8/1981 | Tusing | 172/776 |
| 4,336,846 A | * | 6/1982 | Boetto | 172/776 |
| 4,418,763 A | * | 12/1983 | Boetto | 172/776 |
| 4,526,235 A | * | 7/1985 | Kinzenbaw | 172/126 |
| 4,630,526 A | | 12/1986 | Burk et al. | |
| 4,915,014 A | | 4/1990 | Gilmore et al. | |
| 4,923,017 A | * | 5/1990 | Meek et al. | 172/776 |
| 5,573,070 A | * | 11/1996 | Meek et al. | 172/131 |
| 5,921,325 A | * | 7/1999 | Meek et al. | 172/311 |
| 6,318,477 B1 | * | 11/2001 | Bettin | 172/452 |
| 6,611,993 B2 | * | 9/2003 | Ray | 16/280 |
| 2,972,385 A1 | | 2/2011 | Walberg | |
| 8,011,439 B2 | * | 9/2011 | Gadzella et al. | 172/126 |
| 8,122,970 B2 | * | 2/2012 | Palen | 172/311 |
| 2010/0200256 A1 | * | 8/2010 | Gadzella et al. | 172/424 |

* cited by examiner

*Primary Examiner* — Árpád Fábián-Kovács

(57) ABSTRACT

A pivot limiting device for an agricultural implement is disclosed. The agricultural implement includes a first frame section pivotally coupled to second frame section at a pivot location. The device includes a compression structure having a spring compressed to a preset load. The compression structure is coupled to the first frame section. A plunger includes a first portion positioned adjacent the second frame section and a second portion positioned adjacent the compression structure to move relative thereto between a first position placing no additional compression on the spring when the second frame section pivots in a first direction and contacts the plunger with a first force less than or equal to the preset load, and a second position further compressing the spring when the second frame section pivots in the first direction and contacts the plunger with a second force greater than the preset load.

20 Claims, 3 Drawing Sheets

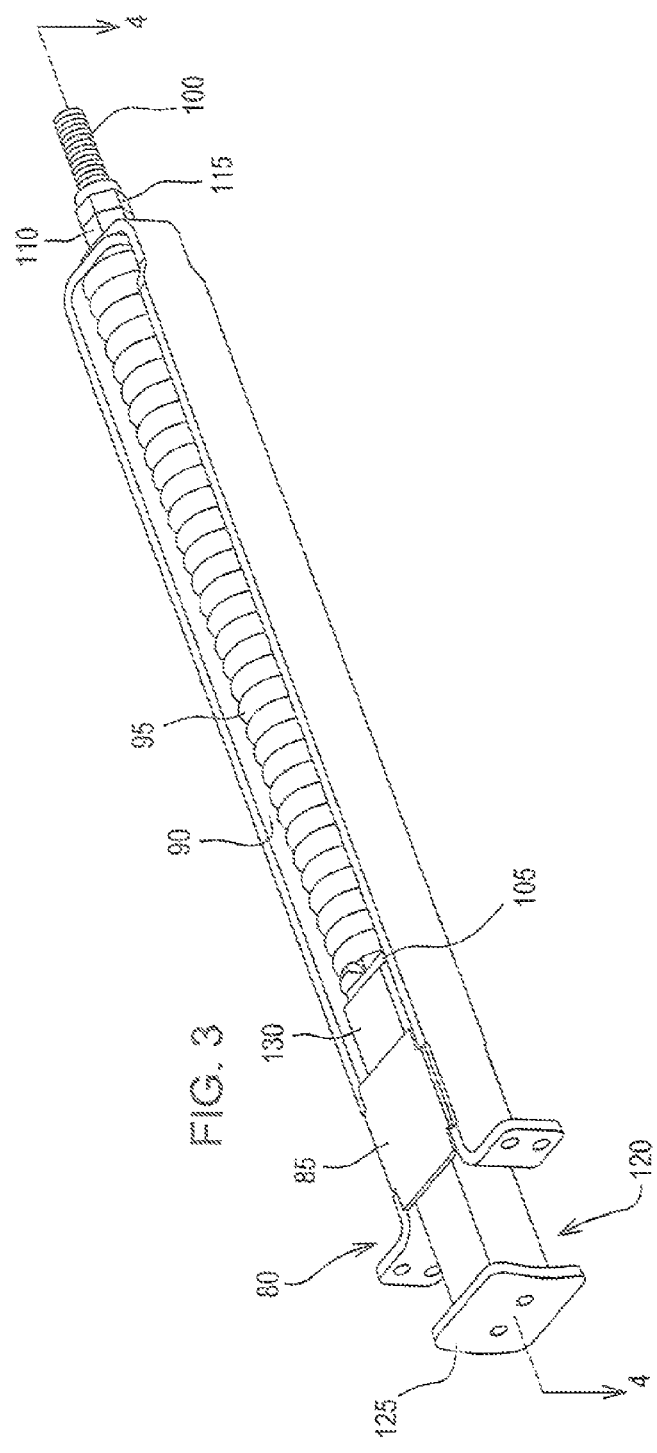
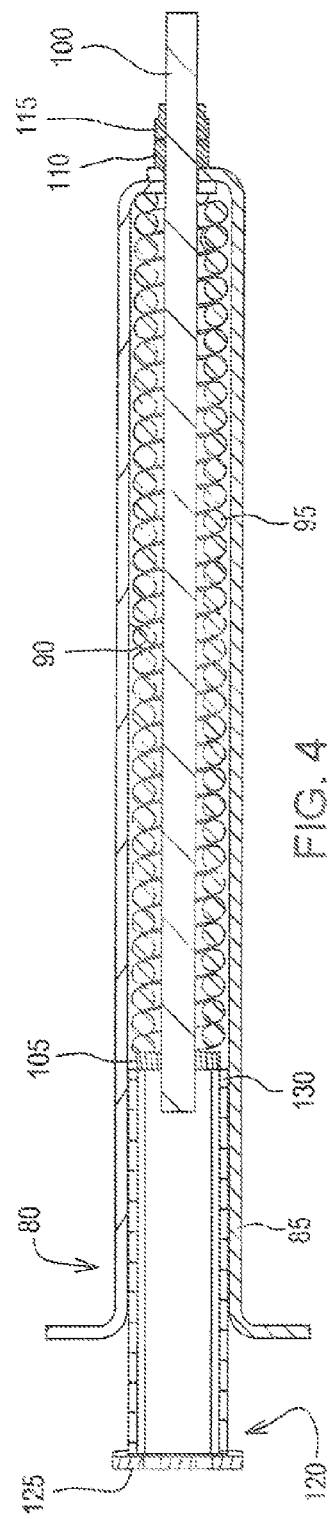

FRAME SECTION PIVOT LIMITING DEVICE

CROSS-REFERENCE TO RELATED APPLICATION

This application claims priority under 35 U.S.C. §119 to Indian patent application number 159MUM2012, filed on 17 Jan. 2012, the disclosure of which is incorporated herein by reference.

FIELD OF THE DISCLOSURE

The present disclosure generally relates to agricultural implements, and more particularly to a pivot limiting device of a frame section of agricultural implements.

BACKGROUND OF THE DISCLOSURE

In order to provide a wider working width and yet an acceptable transport, width, agricultural implements commonly include a plurality of foldable frame sections. The foldable frame sections are pivotally coupled to one another at a pivot location so that the agricultural implement can more closely follow the contour of the ground and yet fold for transport. The frame sections support a plurality of ground-engaging tools (e.g., disk gang assemblies), which are drawn through the soil.

As the ground-engaging tools are drawn through the soil, forces are applied to the ground-engaging tools in a rearward, an upward, and an inward direction. These forces are often referred to as draft force, penetration force, and thrust force, respectively. Since the thrust force is applied below the pivot location, there is a moment or twist load applied at the pivot location. The twist load can cause each frame section to drive deep into the soil on one end while driving shallow at the other end. This non-uniform depth across a frame section can create streaks in a field, uneven seed bed preparation, and uneven volunteer vegetation growth.

Often, the hinge axis is lowered or weight is added to the frame sections near the pivot location to create a more uniform depth. Alternatively, the frame sections are locked together at the pivot location. A hydraulic system for controlling weight transfer between the frame sections is illustrated in commonly assigned U.S. Pat. No. 4,630,526.

SUMMARY OF THE DISCLOSURE

In one embodiment, a pivot limiting device for an agricultural implement is disclosed. The agricultural implement includes a first frame section. A second frame section is pivotally coupled to the first frame section at a pivot location. A first ground-engaging tool is coupled to the first frame section. A second ground-engaging tool is coupled to the second frame section.

The pivot limiting device includes a compression structure having a spring compressed to a preset load. The compression structure is coupled to the first frame section. Alternatively, the compression structure may be coupled to the second frame section. A plunger including a first portion is positioned adjacent the second frame section. Alternatively, the first portion of the plunger may be positioned adjacent the first frame section. The plunger includes a second portion positioned adjacent the compression structure to move relative thereto between a first position placing no additional compression on the spring when the second frame section pivots in a first direction at the pivot location and contacts the first portion of the plunger with a first force less than or equal to the preset load. Alternatively, the first frame section may pivot in the first direction at the pivot location and contact the first portion of the plunger. The second portion moves to a second position placing the spring under further compression and thereby limiting pivotal movement of the second frame section relative to the first frame section when the second frame section pivots in the first direction at the pivot location and contacts the first portion of the plunger with a second force greater than the preset load. Alternatively, pivotal movement of the first frame section relative to the second frame section may be limited when the first frame section pivots in the first direction at the pivot location and contacts the first portion of the plunger.

The second frame section is not under load from the pivot limiting device when the first frame section and the second frame section are axially aligned. Alternatively, the first frame section is not under load from the pivot limiting device when the first frame section and the second frame section are axially aligned. The pivot limiting device may include a hinge at the pivot location configured to allow the second frame section to pivot relative to the first frame section in a second direction, opposite of the first direction, with no load from the pivot limiting device. Alternatively, the hinge may be configured to allow the first frame section to pivot relative to the second frame section.

The first ground-engaging tool may be a first disk gang assembly and the second ground-engaging tool may be a second disk gang assembly. The pivot limiting device may stop pivotal movement of the second frame section relative to the first frame section when the spring is compressed by the plunger creating a spring force that is equal to or greater than the second force. Alternatively, the pivot limiting device may stop pivotal movement of the first frame section relative to the second frame section when the spring is compressed by the plunger creating a spring force that is equal to or greater than the second force.

The compression structure may further include a housing having an interior portion containing the spring. A threaded shaft may pass from exterior of the housing, into the inner portion, and through the spring. A first fastener may be threadably engaged with the threaded shaft in the interior portion and secure the spring in the interior portion. A second fastener may be threadably engaged with the threaded shaft exterior of the housing and operable to compress the spring to the preset load. The second portion of the plunger may be positioned adjacent the first fastener. It is contemplated by this disclosure that the pivot limiting device may be an add-on device that is retrofitted to existing agricultural implements.

In another embodiment, an agricultural implement is disclosed. The agricultural implement includes a coupling mechanism for coupling to a vehicle. A first frame section is coupled to the coupling mechanism and extends from the coupling mechanism. The first frame section is adapted to be pulled by the vehicle in a direction of travel. A second frame section is pivotally coupled to the first frame section at a pivot location. A plurality of wheel assemblies is coupled to the first frame section and the second frame section. The wheel assemblies support the first frame section and the second frame section above a surface. A first ground-engaging tool is coupled to the first frame section. A second ground-engaging tool is coupled to the second frame section. The agricultural implement includes a pivot limiting device as described in the embodiment above.

In yet another embodiment, a method of limiting pivotal movement of an agricultural implement is disclosed. The agricultural implement includes a first frame section and a second frame section pivotally coupled to the first frame section at a pivot location. A first ground-engaging tool is coupled to the first frame section. A second ground-engaging tool is coupled to the second frame section. The method includes providing a compression structure including a spring compressed to a preset load. The compression structure is coupled to the first frame section. Alternatively, the compression structure may be coupled to the second frame section. The method includes providing a plunger including a first portion positioned adjacent the second frame section and a second portion positioned adjacent the compression structure. Alternatively, the first portion of the plunger may be positioned adjacent the first frame section. The method includes moving the plunger relative to the compression structure between a first position placing no additional compression on the spring when the second frame section pivots in a first direction at the pivot location and contacts the first portion of the plunger with a first force that is less than or equal to the preset load. Alternatively, the first frame section may pivot in the first direction at the pivot location and contact the first portion of the plunger. The method includes moving the plunger relative to the compression structure to a second position placing the spring under further compression and thereby limiting pivotal movement of the second frame section relative to the first frame section when the second frame section pivots in the first direction at the pivot location and contacts the first portion of the plunger with a second force that is greater than the preset load. Alternatively, pivotal movement of the first frame section relative to the second frame section may be limited when the first frame section pivots in the first direction at the pivot location and contacts the first portion of the plunger.

BRIEF DESCRIPTION OF THE DRAWINGS

FIG. 3 is an enlarged perspective view of the pivot limiting device of the agricultural implement of FIG. 1.

FIG. 4 is a sectional view taken along lines 4-4 of FIG. 3.

Before any embodiments are explained in detail, it is to be understood that the disclosure is not limited in its application to the details of construction and the arrangement of components set forth in the following description or illustrated in the following drawings. The disclosure is capable of other embodiments and of being practiced or of being carried out in various ways.

DETAILED DESCRIPTION

Figure 1:
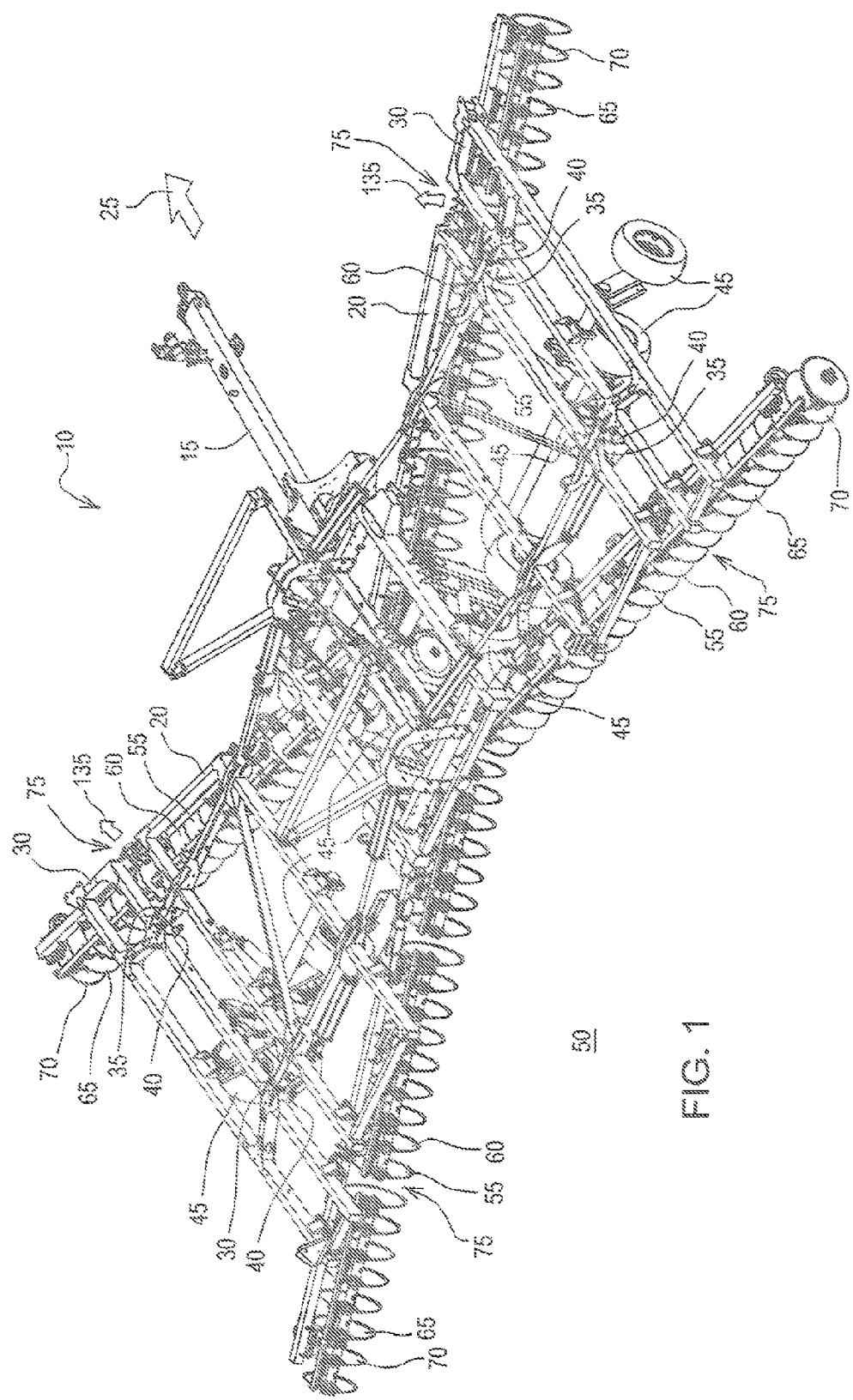
FIG. 1 is a perspective view of an agricultural implement according to one embodiment showing a pivot limiting device.

FIG. 1 illustrates an agricultural implement 10 according to one embodiment. The illustrated agricultural implement 10 includes a coupling mechanism 15 for coupling to a vehicle (not shown).

A first frame section 20 is coupled to the coupling mechanism 15. The first frame section 20 extends rearwardly from the coupling mechanism 15 in a direction opposite of a direction of travel 25. A second frame section 30 is pivotally coupled to the first frame section 20 at a pivot location 35. The illustrated pivot location 35 is a hinge 40. A plurality of wheel assemblies 45 are coupled to the first and second frame sections 20, 30. The wheel assemblies 45 support the first and second frame sections 20, 30 above a surface 50.

A first ground-engaging tool 55 is coupled to the first frame section 20. The illustrated first ground-engaging tool 55 is a first disk gang assembly 60. A second ground-engaging tool 65 is coupled to the second frame section 30. The illustrated second ground-engaging tool 65 is a second disk gang assembly 70.

Figure 2:
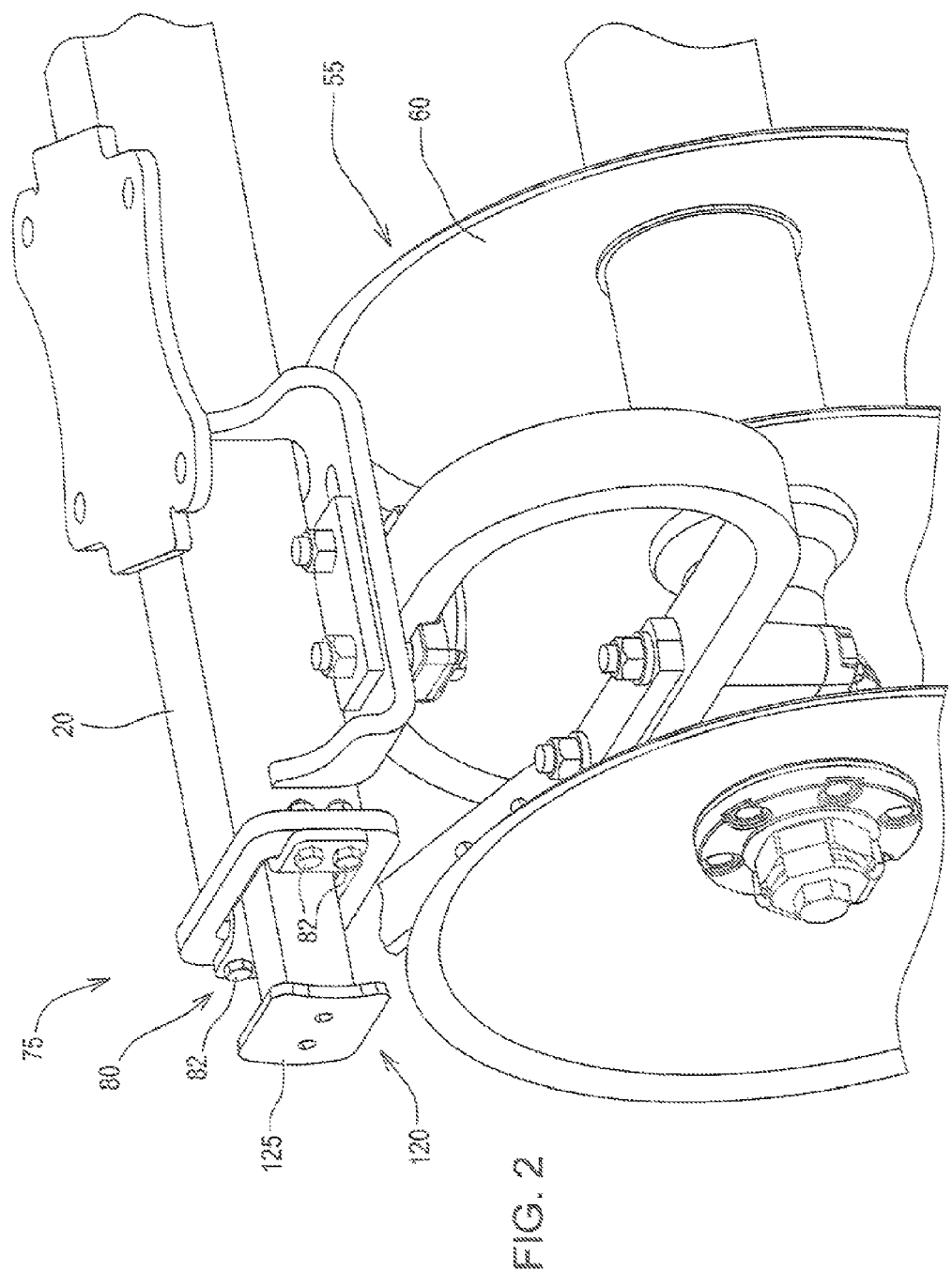
FIG. 2 is an enlarged perspective view of a portion of the agricultural implement of FIG. 1.

FIGS. 1-4 illustrate a pivot limiting device 75, which is direct-acting and not remote from the pivot location 35. Although the illustrated agricultural implement 10 depicts four pivot limiting devices 75, less than four and more than four pivot limiting devices 75 are contemplated by this disclosure. Referring to FIG. 2, the pivot limiting device 75 includes a compression structure 80 that is coupled to the first frame section 20 with a plurality of fasteners 82. Referring to FIGS. 3 and 4, the compression structure 80 includes a housing 85 having an interior portion 90 containing a spring 95. A threaded shaft 100 passes from exterior of the housing 85 into the interior portion 90 and through the spring 95. A first fastener 105 is threadably engaged with the threaded shaft 100 in the interior portion 90 and secures the spring 95 in the interior portion 90. A second fatener 110 is threadably engaged with the threaded shaft 100 exterior of the housing 85. A jam nut 115 secures the second fastener 110.

A plunger 120 includes a first portion 125 positioned adjacent the second frame section 30. The plunger 120 includes a second portion 130 positioned adjacent the first fastener 105 in the compression structure 80.

In operation, the coupling mechanism 15 is adapted to be pulled by the vehicle in the direction of travel 25. As illustrated in FIG. 1, on level ground, the first frame section 20 is axially aligned with the second frame section 30 such that the pivot limiting device 75 applies no load to the second frame section 30. The second fastener 110 is operable to compress the spring 95 to a preset load and the second portion 130 of the plunger 120 is positioned to move relative to the compression structure 80 between a first position placing no additional compression on the spring 95 when the second frame section 30 pivots in a first direction 135 at the pivot location 35 and contacts the first portion 125 of the plunger 120 with a first force that is less than or equal to the preset load. The second portion 130 of the plunger 120 is also positioned to move relative to the compression structure 80 to a second position placing the spring 95 under further compression and thereby limiting pivotal movement of the second frame section 30 relative to the first frame section 20 when the second frame section 30 pivots in the first direction 135 at the pivot location 35 and contacts the first portion 125 of the plunger 120 with a second force that is greater than the preset load.

Therefore, once the thrust force causes the second frame section 30 to pivot relative to the first frame section 20 in the first direction 135, the spring 95 begins to apply the preset load. Once the preset load is completely applied, the plunger 120 slides and compresses the spring 95 further and applies a spring force equivalent to a linear spring rate plus the preset load. No outside controls are required to activate the pivot limiting device 75.

The pivot limiting device 75 is operable to stop, pivotal movement of the second frame section 30 relative to the first frame section 20 when the spring 95 is compressed by the plunger 120 creating the spring force that is equal to or greater than the second force. Alternatively, the pivot limiting device 75 is operable to stop pivotal movement of the first frame section 20 relative to the second frame section 30.

While the disclosure has been illustrated and described in detail in the drawings and foregoing description, such illustration and description is to be considered as exemplary and not restrictive in character, it being understood that illustrative embodiments have been shown and described and that all changes and modifications that come within the spirit of the disclosure are desired to be protected. It will be noted that alternative embodiments of the present disclosure may not include all of the features described yet still benefit from at least some of the advantages of such features. Those of ordinary skill in the art may readily devise their own implementations that incorporate one or more of the features of the present disclosure and fall within the spirit and scope of the present invention as defined by the appended claims.

Various features are set forth in the following claims.

What is claimed is:

1. A pivot limiting device for an agricultural implement, the agricultural implement including a first frame section, a second frame section pivotally coupled to the first frame section at a pivot location, a first ground-engaging tool coupled to the first frame section, and a second ground-engaging tool coupled to the second frame section, the pivot limiting device comprising:
    a compression structure comprising a housing comprising an interior portion containing a spring compressed to a preset load, the compression structure coupled to the first frame section with the spring positioned within the first frame section; and
    a plunger comprising a first portion positioned adjacent the second frame section and a second portion positioned adjacent the compression structure to move relative thereto between a first position placing no additional compression on the spring when the second frame section pivots in a first direction at the pivot location and contacts the first portion of the plunger with a first force that is less than or equal to the preset load, and a second position placing the spring under further compression and thereby limiting pivotal movement of the second frame section relative to the first frame section when the second frame section pivots in the first direction at the pivot location and contacts the first portion of the plunger with a second force that is greater than the preset load.

2. The pivot limiting device of claim 1, wherein the second frame section is not under load from the pivot limiting device when the first frame section and the second frame section are axially aligned.

3. The pivot limiting device of claim 1, further comprising a hinge at the pivot location configured to allow the second frame section to pivot relative to the first frame section in a second direction, opposite of the first direction, with no load from the pivot limiting device.

4. The pivot limiting device of claim 1, wherein the first ground-engaging tool is a first disk gang assembly and the second ground-engaging tool is a second disk gang assembly.

5. The pivot limiting device of claim 1, wherein the compression structure is coupled to the second frame section, the first portion of the plunger is positioned adjacent the first frame section, and the second portion of the plunger moves relative to the compression structure between the first position placing no additional compression on the spring when the first frame section pivots in the first direction at the pivot location and contacts the first portion of the plunger with the first force that is less than or equal to the preset load, and the second position placing the spring under further compression and thereby limiting pivotal movement of the first frame section relative to the second frame section when the first frame section pivots in the first direction at the pivot location and contacts the first portion of the plunger with the second force that is greater than the preset load.

6. The pivot limiting device of claim 1, wherein the pivot limiting device stops pivotal movement of second frame section relative to the first frame section when the spring is compressed by the plunger creating a spring force that is equal to or greater than the second force.

7. The pivot limiting device of claim 1, wherein the compression structure further comprises a threaded shaft passing from exterior of the housing, into the interior portion, and through the spring, a first fastener threadably engaged with the threaded shaft in the interior portion and securing the spring in the interior portion, and a second fastener threadably engaged with the threaded shaft exterior of the housing and operable to compress the spring to the preset load.

8. The pivot limiting device of claim 7, wherein the second portion of the plunger is positioned adjacent the first fastener.

9. An agricultural implement comprising:
    a coupling mechanism for coupling to a vehicle;
    a first frame section coupled to the coupling mechanism and extending from the coupling mechanism and adapted to be pulled by the vehicle in a direction of travel;
    a second frame section pivotally coupled to the first frame section at a pivot location;
    a plurality of wheel assemblies coupled to the first frame section and the second frame section, the wheel assemblies supporting the first frame section and the second frame section above a surface;
    a first ground-engaging tool coupled to the first frame section;
    a second ground-engaging tool coupled to the second frame section; and
    a pivot limiting device comprising a compression structure comprising a housing comprising an interior portion containing a spring compressed to a preset load, the compression structure coupled to the first frame section with the spring positioned within the first frame section, and a plunger comprising a first portion positioned adjacent the second frame section and a second portion positioned adjacent the compression structure to move relative thereto between a first position placing no additional compression on the spring when the second frame section pivots in a first direction at the pivot location and contacts the first portion of the plunger with a first force less than or equal to the preset load, and a second position placing the spring under further compression and thereby limiting pivotal movement of the second frame section relative to the first frame section when the second frame section pivots in the first direction at the pivot location and contacts the first portion of the plunger with a second force greater than the preset load.

10. The agricultural implement of claim 9, wherein the second frame section is not under load from the pivot limiting device when the first frame section and the second frame section are axially aligned.

11. The agricultural implement of claim 9, further comprising a hinge at the pivot location configured to allow the second frame section to pivot relative to the first frame section in a second direction, opposite of the first direction, with no load from the pivot limiting device.

12. The agricultural implement of claim 9, wherein the first ground-engaging tool is a first disk gang assembly and the second ground-engaging tool is a second disk gang assembly.

13. The agricultural implement of claim 9, wherein the compression structure is coupled to the second frame section, the first portion of the plunger is positioned adjacent the first frame section, and the second portion of the plunger moves relative to the compression structure between the first position placing no additional compression on the spring when the first frame section pivots in the first direction at the pivot location and contacts the first portion of the plunger with the first force that is less than or equal to the preset load, and the second position placing the spring under further compression and thereby limiting pivotal movement of the first frame section relative to the second frame section when the first frame section pivots in the first direction at the pivot location and contacts the first portion of the plunger with the second force that is greater than the preset load.

14. The agricultural implement of claim 9, wherein the pivot limiting device stops pivotal movement of second frame section relative to the first frame section when the spring is compressed by the plunger creating a spring force that is equal to or greater than the second force.

15. The agricultural implement of claim 9, wherein the compression structure further comprises a threaded shaft passing from exterior of the housing, into the interior portion, and through the spring, a first fastener threadably engaged with the threaded shaft in the interior portion and securing the spring in the interior portion, and a second fastener threadably engaged with the threaded shaft exterior of the housing and operable to compress the spring to the preset load.

16. The agricultural implement of claim 15, wherein the second portion of the plunger is positioned adjacent the first fastener.

17. A method of limiting pivotal movement of an agricultural implement, the agricultural implement comprising a first frame section, a second frame section pivotally coupled to the first frame section at a pivot location, a first ground-engaging tool coupled to the first frame section, and a second ground-engaging tool coupled to the second frame section, the method comprising:
   providing a compression structure comprising a housing comprising an interior portion containing a spring compressed to a preset load, the compression structure coupled to the first frame section with the spring positioned within the first frame section;
   providing a plunger comprising a first portion positioned adjacent the second frame section and a second portion positioned adjacent the compression structure
   moving the plunger relative to the compression structure between a first position placing no additional compression on the spring when the second frame section pivots in a first direction at the pivot location and contacts the first portion of the plunger with a first force that is less than or equal to the preset load; and
   moving the plunger relative to the compression structure to a second position placing the spring under further compression and thereby limiting pivotal movement of the second frame section relative to the first frame section when the second frame section pivots in the first direction at the pivot location and contacts the first portion of the plunger with a second force that is greater than the preset load.

18. The method of claim 17, wherein the second frame section is not under load from the compression structure when the first frame section and the second frame section are axially aligned.

19. The method of claim 17, further comprising a hinge at the pivot location configured to allow the second frame section to pivot relative to the first frame section in a second direction, opposite of the first direction, with no load from the compression structure.

20. The method of claim 17, wherein the compression structure is coupled to the second frame section, the first portion of the plunger is positioned adjacent the first frame section, and the second portion of the plunger moves relative to the compression structure between the first position placing no additional compression on the spring when the first frame section pivots in the first direction at the pivot location and contacts the first portion of the plunger with the first force that is less than or equal to the preset load, and the second position placing the spring under further compression and thereby limiting pivotal movement of the first frame section relative to the second frame section when the first frame section pivots in the first direction at the pivot location and contacts the first portion of the plunger with the second force that is greater than the preset load.

* * * * *